…

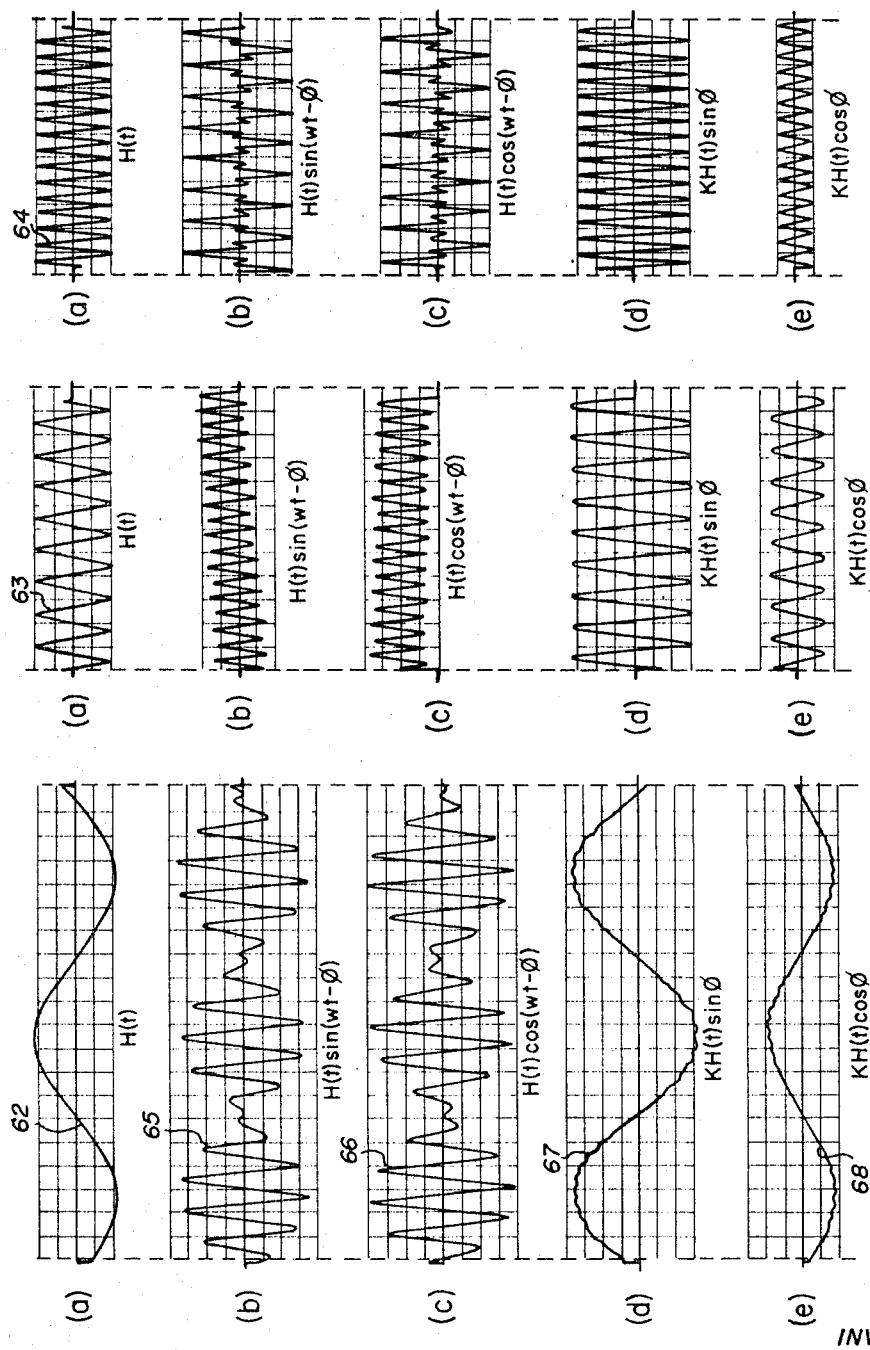

United States Patent Office 3,464,016
Patented Aug. 26, 1969

3,464,016
DEMODULATION SYSTEM
William J. Kerwin, Sunnyvale, Michael G. Dix, Monte Vista, and Robert M. Munoz, Los Altos, Calif., assignors to the United States of America as represented by the Administrator of the National Aeronautics and Space Administration
Filed Jan. 13, 1966, Ser. No. 520,839
Int. Cl. G01n 27/00
U.S. Cl. 328—1    7 Claims

ABSTRACT OF THE DISCLOSURE

A demodulation system for removing unwanted amplitude modulation from two quadrature-displaced data-bearing signals. Quadrature related reference signals locked in frequency and phase to the amplitude modulation function are generated. The reference signals and data-bearing signals are processed in multipliers, an inverter and adders to provide data-bearing signals that have been stripped of the amplitude modulation.

---

Figure 1:
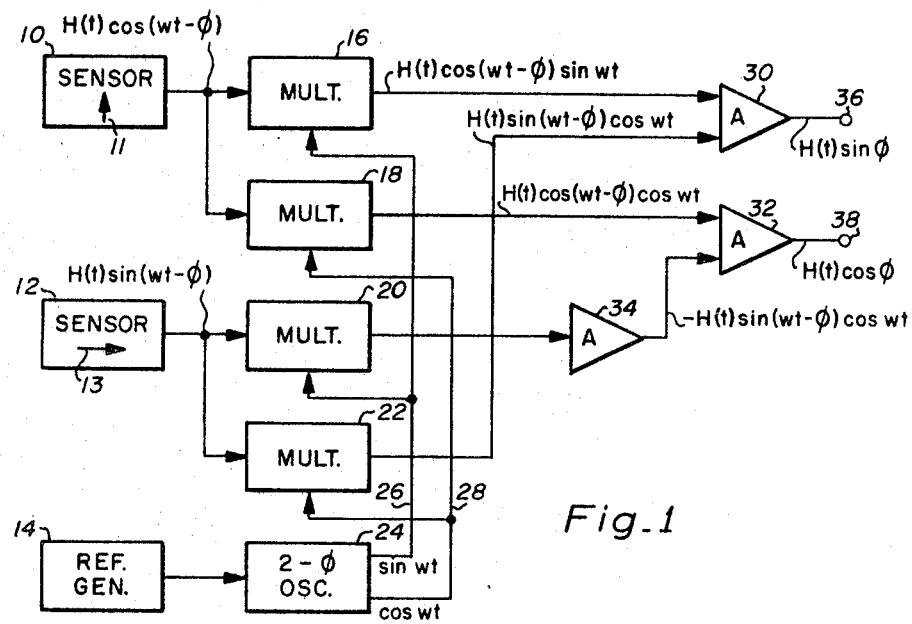

This invention relates to electronic demodulation systems and, more particularly, to an improved system for removing spin modulation effects from data transmitted from a spinning object such as from a space vehicle or satellite.

In most generally known data-gathering systems, the process to be measured and the measuring instrument are normally contained in the same spacial frame of reference. Thus, the measurements made may be interpreted as a direct measure of the process. However, this is not true when the measuring instrument is mounted on a spinning platform, such as would be the case when the instrument is mounted within a satellite. When the measuring instrument is spinning with respect to the process being measured, modulation of the data occurs because of the spinning and the data must be interpreted before the process being measured can be understood. It is therefore necessary to demodulate (remove the spin modulation) such spin-modulated data in such a way that no errors are introduced into the data representative of process or quantity being measured by the demodulation system.

Heretofore, several methods have been employed to provide the required spin removal demodulation. However, each of these has been limited in its total effectiveness by its inability to pass frequencies equal to or greater than the modulation frequency which, in the case of data gathered from a spinning platform, is the frequency at which the platform is spinning.

One such prior art amplitude demodulator consists of a simple leak detector. Such a detector includes a rectifier followed by a filter. The rectifier, in effect, samples the peak of each cycle of a carrier signal and the filter smooths the output of the rectifier, or, in other words, fills in the gaps between the peaks of the carrier wave signal. The effectiveness of this type of circuit is related to the amount of frequency separation between the carrier signal frequency and the frequency of the data-bearing signal, and the latter frequency cannot be close to or higher than the former.

Another prior art technique, which suffers from the same disadvantages as the peak detector technique previously described, is the so-called "synchrodyne" technique. In the synchrodyne system, a reference signal identical in frequency to the carrier signal is multiplied by the modulated carrier signal to produce two conventional side bands at the sum and difference frequencies. If the frequencies of the reference signal and the carrier signal are identical, the output contains a signal having a frequency of twice that of the data-bearing signal. A filter is used to separate the upper and lower side bands to recover the original data. Because the upper side band of the modulated input data extends down to the carrier wave frequency, it is not possible to recover input data in the frequency range between the carrier signal frequency and its second harmonic. If ideal filtering were possible, data could be recovered in a frequency range extending up to the carrier signal frequency, but no higher.

It is therefore a primary object of this invention to provide a demodulating system which allows the removal or elimination of an unwanted modulation from data-bearing signals.

It is a further object of this invention to provide a demodulation system by which spin modulation may be eliminated from data-bearing signals for any spin frequency, that is spin frequencies which are less, equal, or greater than the frequency variation of the phenomena being measured.

It is another object of this invention to provide a demodulation system which does not have the limitations of the relatively simple demodulators heretofore described and, wherein data signals having frequencies below, equal to and above the carrier signal frequency can be clearly interpreted.

One embodiment of the present invention utilizes two directional sensors mounted on a spinning platform with the axes of sensitivity of the two sensors displaced from each other by substantially 90°, in order to obtain $x$ and $y$ components of a quantity to be measured. A two-phase oscillator is locked in both frequency and phase to the spinning platform. For every revolution of the spinning platform, the oscillator generates one complete cycle, whose beginning and end occur at exactly the same position of the platform for each revolution.

The two-phase oscillator provides a first output signal represented by $\sin wt$, and a second signal, which is displaced by 90° from the first signal, represented by $\cos wt$. These two signals are multiplied by the output signals from the two sensors and combined, so as to produce a measure of the magnitude of the input signal information determined by the phase-locked reference signal. Thus, the input data measured by means of the spinning sensors is spin demodulated and recovered in the form of two orthogonal components. As a result, errors normally encountered in peak demodulation or in synchronous demodulation, as previously described, are eliminated.

Figure 2:
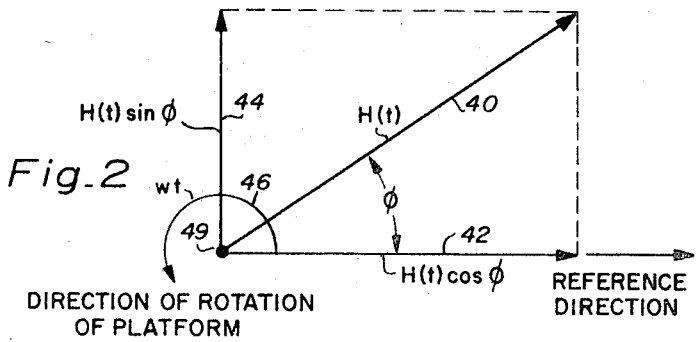
Figure 3:
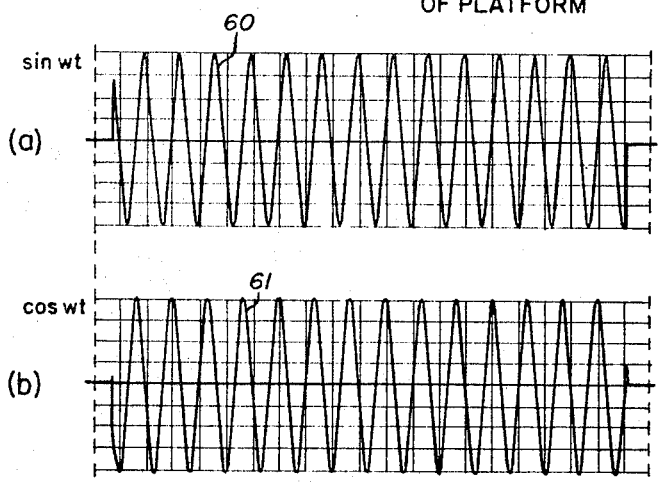

Further features and advantages of the invention will be better understood from the following description of several embodiments thereof, taken in conjunction with the accompanying drawings, in which:

FIGURE 1 is a block diagram of a system embodying the invention;

FIGURE 2 is a vector diagram useful in understanding the operation of the invention illustrated in FIGURE 1; and FIGURES 3–6 are waveforms plotted to the same time scale. More particularly, FIGURE 3 illustrates the waveforms of signals from the two-phase oscillator and FIG- URES 4-6 respectively illustrate the waveforms of signals and various points of the circuit of FIGURE 1 for a spin frequency which is larger, equal and smaller than the frequency variation of the phenomena being measured.

As shown in FIGURE 1, a pair of directional sensors 10 and 12 are mounted on a spinning platform, such as might be contained in a satellite. It is to be understood that although the present invention is presented in the context of making measurements from a spinning satellite, it may also be useful in other applications. It may find utility in other types of data sensing systems, in tape recording systems, and in radio direction finding systems, wherein frequency translation is required with high accuracy such as might be needed in spectrum analysis and phase translation.

The apparatus shown in FIGURE 1 also includes a reference signal generator 14 and multipliers 16, 18, 20 and 22. One of the input terminals of the multipliers is connected to the sensors 10 and 12, as will be hereinafter described. The output terminal of the reference signal generator 14, which is locked in frequency and phase to the spinning platform (not shown), is connected to the input terminal of a two-phase oscillator 24. The other of the input terminals of the multipliers is connected to two-phase oscillator 24. In this manner multipliers 16, 18, 20, and 22 are each receiving two input signals and produce an output signal that is the product of the two input signals.

In the example chosen, sensors 10 and 12 are oriented on the spinning platform with their axes of sensitivity, indicated by arrows 11 and 13 respectively, displaced by 90° to obtain the $x$ and $y$ components of the quantity to be measured. Two-phase oscillator 24 produces a signal on a line 26 which is equivalent to sin $wt$, and a signal on a line 28 which is equivalent to cos $wt$, where $w$ is the angular velocity of the spinning platform about an axis at right angles to arrows 11 and 13 in radians per second and $t$ is time measured in seconds. As previously mentioned, the two signals appearing on the lines 26 and 28 are in space quadrature with respect to one another.

The output signal of sensor 10 is applied to one of the input terminals of multipliers 16 and 18, and the output signal of sensor 12 is similarly applied to one of the input terminals of multipliers 20 and 22. Second input signals to multipliers 16 and 20 are applied on line 26 from one output terminal of two-phase oscillator 24 in the form of "sin $wt$." Second input signals to multipliers 18 and 22 are applied on line 28 from the other output terminal of two-phase oscillator 24 in the form of "cos $wt$."

The output signals from the multipliers 16 and 22 are utilized as input signals to a conventional summing amplifier 30, which amplifier forms an output signal commensurate with the sum of the signals applied to it. The output signals from multipliers 18 and 20 are utilized as the input signals to another conventional summing amplifier 32, the signal from multiplier 22 being first inverted by a conventional inverting amplifier 34. In this manner summing amplifier 32 forms an output signal commensurate with the difference of the output signals from multipliers 18 and 20. The output signal of summing amplifier 30 is applied to an output terminal 36, and the output signal of the summing amplifier 32 is applied to an output terminal 38.

As will now be shown, with the aid of FIGURE 2 and a mathematical analysis of the invention, the output signals available from terminals 36 and 38 are independent of the angular velocity of the platform with respect to the phenomena being measured. The terms to be used in the mathematical analysis are as follows:

$t$=time in seconds;
$H(t)$=process or phenomena to be measured which may be a function of time;
$w$=angular velocity of the sensor mount about an axis perpendicular to the sensor axis in radians per second;
$\phi$=angle between fixed reference line and the phenomena to be measured.

These quantities are graphically shown in FIGURE 2 in which line 40 represents the phenomena being measured, namely $H(t)$, lines 42 and 44 are the sensitivity directions of sensors 10 and 12 respectively at a given instant of time with respect to $H(t)$ and form angle $\phi$ and $(90-\phi)$ with the phenomena being measured, and curved line 46 represents the angular motion of lines 42 and 44, and thereby of the sensor mount, about an axis coming out of the paper as indicated by point 49.

From FIGURE 2 it is thus immediately apparent that the output signal of sensor 10 is $H(t) \cos(wt-\phi)$ and of sensor 12 is $(-)H(t) \sin(wt-\phi)$.

The multiplication performed by multipliers 16, 18, 20 and 22 will result in the output signals given by the following equations.

The output signal of multiplier 16 is:

$$H(t) \cos(wt-\phi) \sin wt \quad (1)$$

The output signal of multiplier 18 is:

$$H(t) \cos(wt-\phi) \cos wt \quad (2)$$

The output signal of multiplier 20 is:

$$(-)H(t) \sin(wt-\phi) \sin wt \quad (3)$$

The output signal of multiplier 22 is:

$$(-)H(t) \sin(wt-\phi) \cos wt \quad (4)$$

The output signals of multipliers 16 and 22 are summed by amplifier 30 to provide an output signal Y, mathematically represented by:

$$Y=H(t) \cdot [\cos(wt-\phi) \sin wt - \sin(wt-\phi) \cos wt] \quad (5)$$

Using the trigonometric identity $$\sin(A-B)=\sin A \cos B - \cos A \sin B$$

and letting $$A=wt \text{ and } B=wt-\phi$$

Equation 5 can be simplified to $$Y=H(t) \sin \phi$$

Similarly, the output signals of multipliers 18 and 20, after one of the output signals has been inverted by inverter 34, are summed by amplifier 30 to provide an output signal X, mathematically represented by:

$$X=H(t)[\cos(wt-\phi) \cos wt + \sin(wt-\phi) \sin wt] \quad (6)$$

Employing the trigonometric formula $$\cos(A-B)=\cos A \cos B + \sin A \sin B$$

and letting $$A=wt \text{ and } B=wt-\phi$$

Equation 6 can be simplified to $$X=H(t) \cos \phi$$

The two output signals Y and X shown by Equations 5 and 6 are therefore seen to be the two components of $H(t)$ projected along the reference direction of line 42 and in a direction perpendicular to the reference direction, and are independent of the angular velocity of the sensor mount. These two output signals are available from output terminals 36 and 38, and are usually applied to a data transmission system for telemetering to a ground station to provide an accurate reproduction of a data-bearing signal.

As heretofore stated, the technique just described may be utilized with data-bearing signals from a phenomena whose frequency is below, equal to, or above the frequency of angular rotation of the sensor mount as will now be graphically demonstrated with the aid of FIGURES 3 to 6.

FIGURE 3(a) and (b) respectively depict the output signals from two-phase oscillator 24, the signal appearing on line 26 being shown by line 60, and the signal appearing on line 28 being shown by line 61. Both lines 60 and 61 are sinusoidal waves indicating a constant angular velocity $w$ of the sensor mount. The frequency of the wave is $w/2\pi$.

FIGURES 4, 5 and 6 respectively illustrate the cases where the frequency variation of the data-bearing signal is less, equal to, and greater than the frequency of the output signal from reference generator 14. Generator 14 may be a sun pulse generator or a gyro or any kind of a device to sense angular velocity with respect to an axis fixed in space.

FIGURES 4(a), 5(a) and 6(a) respectively show curves 62, 63 and 64 which represent the variation of the phenomena to be measured with time on a time scale which is identical to the time scale used in FIGURE 3. An inspection of curve 62 shows that its frequency is less than the frequency of curve 60. Similarly, the frequency of curve 63 is equal to the frequency of curve 60, and the frequency of curve 64 is greater than the frequency of curve 60.

FIGURES 4(b) and (c) depict curves 65 and 66 which respectively show the output signals of sensors 10 and 12 for the case where the frequency of the phenomena to be measured is represented by curve 62. FIGURE 4(d) and (e) depicts curves 67 and 68 which respectively show the output signals as applied to output terminals 36 and 38 which, of course, are the components of curve 62.

Similarly, FIGURES 5(b), (c), (d) and (e), and 6(b), (c), (d) and (e) represent the signals corresponding to those represented in FIGURES 4(b), (c), (d) and (e) for the cases where the frequency of the phenomena being measured is equal to and is greater, respectively, than the spin frequency. As is apparent, the data-bearing signal is recoverable regardless of the spin frequency of the sensor mount.

Having thus described the invention, what is claimed as new and desired to be secured by Letters Patent is:

1. A demodulation system for demodulating first and second amplitude modulated data-bearing signals, said two data-bearing signals being identical to each other in frequency but displaced 90° in phase from each other, the system comprising:
    a two-phase oscillator providing first and second signals having frequencies the same as that of the amplitude modulation frequency of said amplitude modulated data-bearing signal, but displaced 90° in phase from each other;
    first, second, third and fourth multipliers, each being adapted to receive two input signals and provide an output signal that is a product of said two input signals;
    means for applying said first amplitude modulated data-bearing signal to said first and second multipliers;
    means for applying said second amplitude modulated data-bearing signal to said third and fourth multipliers;
    means for applying said first signal to said first and third multipliers;
    means for applying said second signal to second and fourth multipliers;
    means for combining the output signals of said first and fourth multipliers to derive a first demodulated signal; and
    means for combining the output signals of said second and third multipliers to derive a second demodulated signal, whereby two demodulated signals are obtained which do not contain the amplitude modulation of the original data-bearing signals.

2. The system defined by claim 1, wherein said means for combining the output signals of said multipliers are summing amplifiers.

3. The system defined by claim 2, wherein the output signal of one of said multipliers is inverted before being applied to one of said summing amplifiers.

4. In a system which produces first and second data-bearing signals from a pair of sensors mounted on a platform with their axes of sensitivity at right angles with respect to one another, and in which the platform rotates to thereby amplitude modulate the first and second data-bearing signals at the rotation frequency of said rotating platform, a demodulation system for eliminating the amplitude modulation comprising:
    a two-phase oscillator providing first and second oscillator signals having the same frequency as said rotation frequency, but being displaced in phase by 90° from each other;
    first, second, third and fourth multipliers, each adapted to receive two input signals and to provide an output signal that is a product of the two input signals;
    said first data-bearing signal and said first oscillator signal being applied to said first multiplier to form a first output signal;
    said first data-bearing signal and said second oscillator signal being applied to said second multiplier to form a second output signal;
    said second data-bearing signal and said first oscillator signal being applied to said third multiplier to form a third output signal;
    said second data-bearing signal and said second oscillator signal being applied to said fourth multiplier to form a fourth output signal;
    means for deriving a first detected signal which is commensurate with the sum of said first and third output signal; and
    means for deriving a second detected signal which is commensurate with the difference of said second and fourth output signal, said detected signals so formed being independent of the amplitude modulation of said original data-bearing signals.

5. A demodulation system in accordance with claim 4 in which said oscillator is mounted on said rotating platform and locked in frequency and phase to said rotating platform.

6. A demodulation system in accordance with claim 4 in which said oscillator, multipliers and means for deriving said first and second detected signal are mounted upon said rotating platform.

7. A data processing system comprising:
    means for developing first and second data-bearing signals which are quadrature components of a data-bearing signal
    means for amplitude modulating said first and second data-bearing signals with first and second modulating signals respectively which are quadrature components of a modulating signal;
    means for developing first and second demodulating signals which are quadrature components of a demodulating signal which has the same frequency and phase as said modulating signal;
    first, second, third and fourth multipliers, each adapted to receive two input signals and to provide an output signal that is a product of said two input signals;
    said first modulated data-bearing signal and said first demodulating signal being applied to said first multiplier to form a first output signal;
    said first modulated data-bearing signal and said second demodulating signal being applied to said second multiplier to form a second output signal;
    said second modulated data-bearing signal and said first demodulating signal being applied to said third multiplier to form a third output signal;
    said second modulated data-bearing signal and said second demodulating signal being applied to said fourth multiplier to form a fourth output signal;
    means for deriving the sum of said first and third output signals to form a first detected signal; and means for deriving the difference of said second and fourth output signals to form a second detected signal, said detected signals being commensurate with said data-bearing signal and independent of the amplitude modulation.

References Cited

UNITED STATES PATENTS

| | | | |
|---|---|---|---|
| 3,065,403 | 11/1962 | Lehmann et al. | 323—122 |
| 3,121,202 | 2/1964 | Gray | 331—11 |
| 3,132,342 | 5/1964 | Ford | 343—705 |
| 3,253,223 | 5/1966 | Kettel | 325—321 |
| 3,273,151 | 9/1966 | Cutler et al. | 343—100 |
| 3,368,036 | 2/1968 | Carter et al. | 178—67 |

ARTHUR GAUSS, Primary Examiner
R. C. WOODBRIDGE, Assistant Examiner

U.S. Cl. X.R.

235—186; 328—133, 166; 343—115